Sept. 7, 1937.  L. SPENCER  2,092,337
FORMATION TESTING APPARATUS
Filed May 1, 1935  4 Sheets-Sheet 1
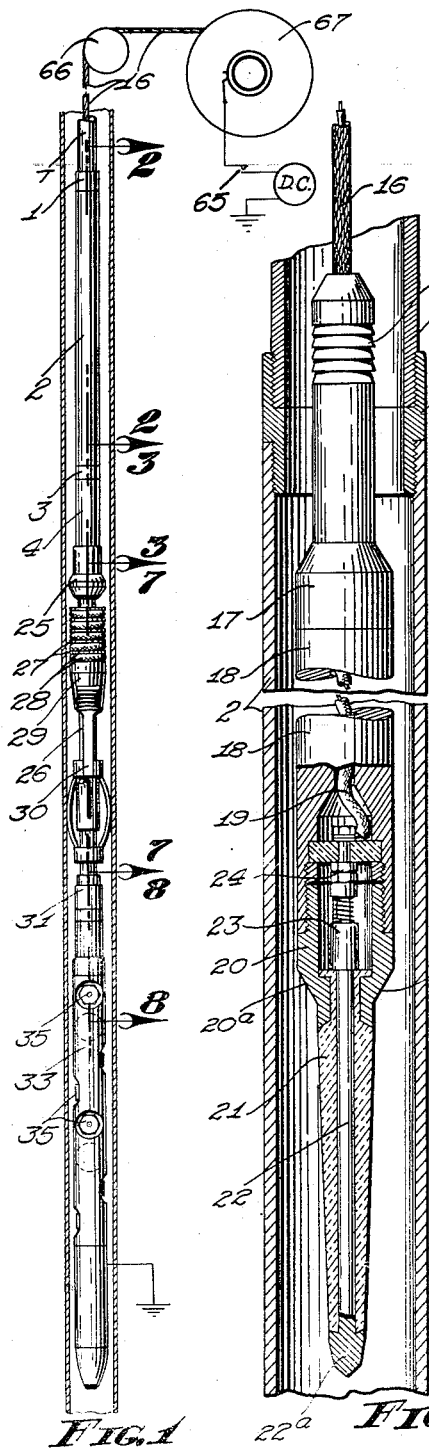
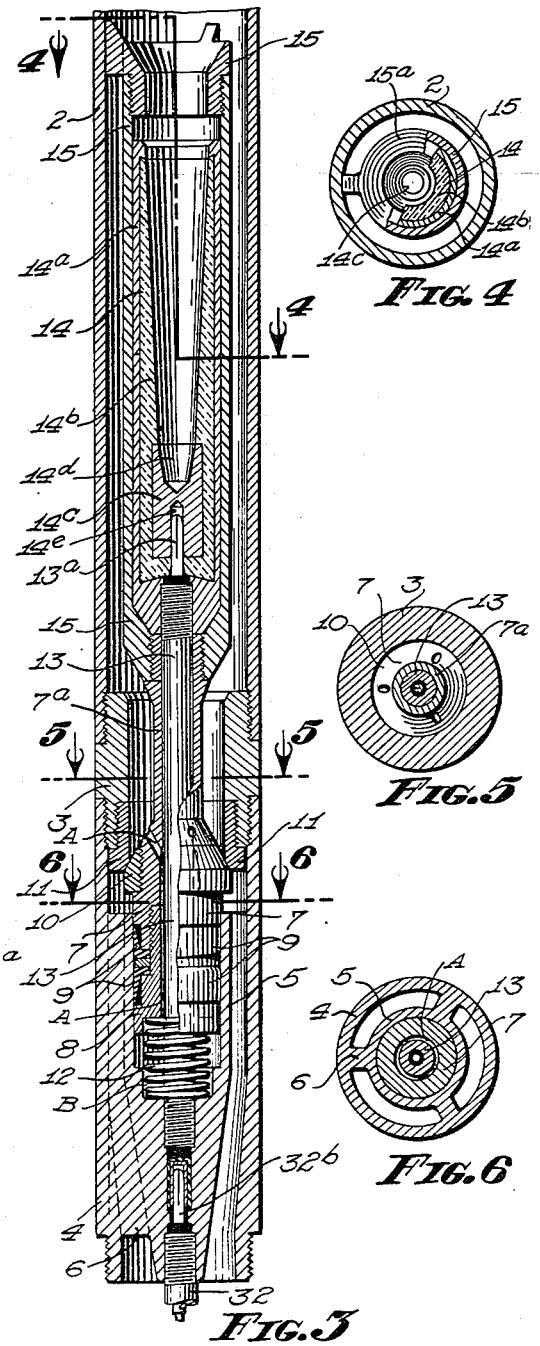
INVENTOR
Lloyd Spencer Sept. 7, 1937.  L. SPENCER  2,092,337
FORMATION TESTING APPARATUS
Filed May 1, 1935  4 Sheets-Sheet 2
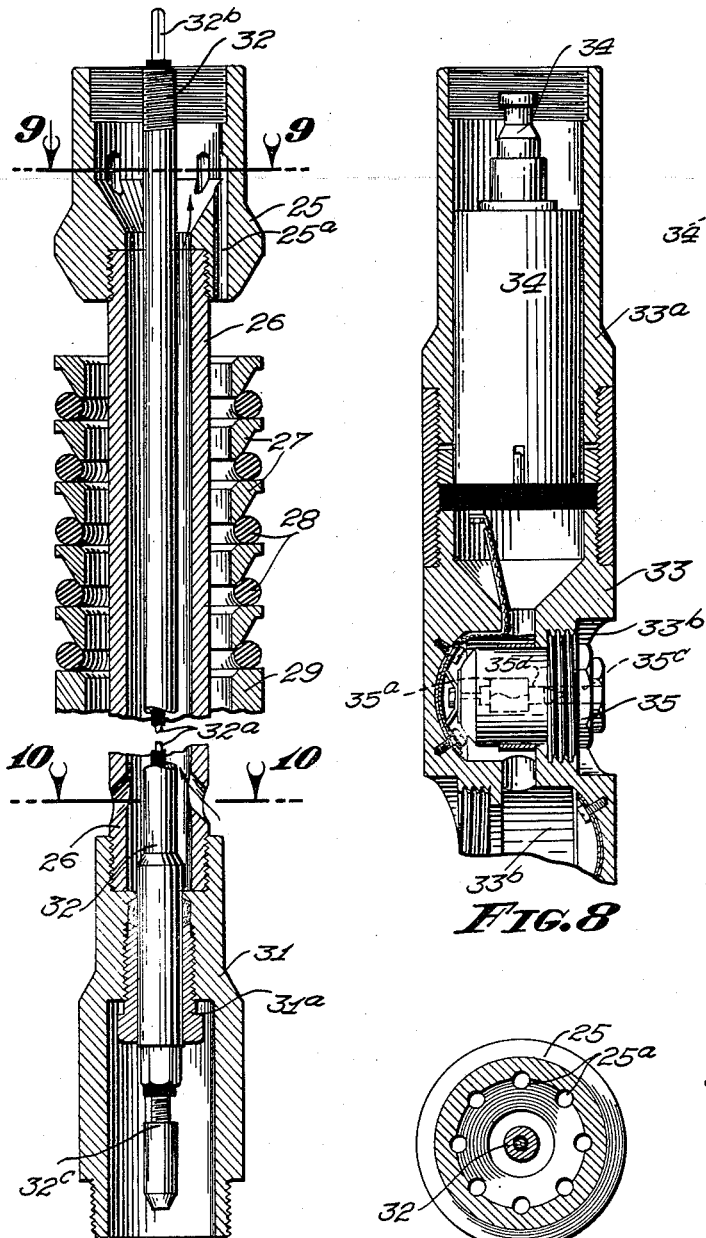
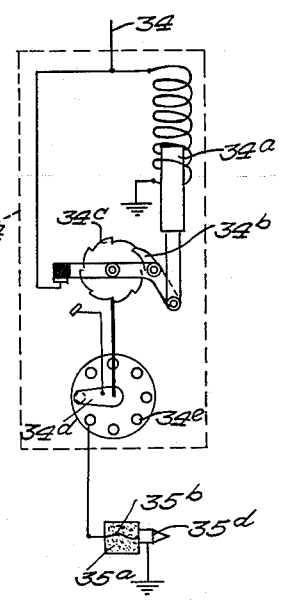
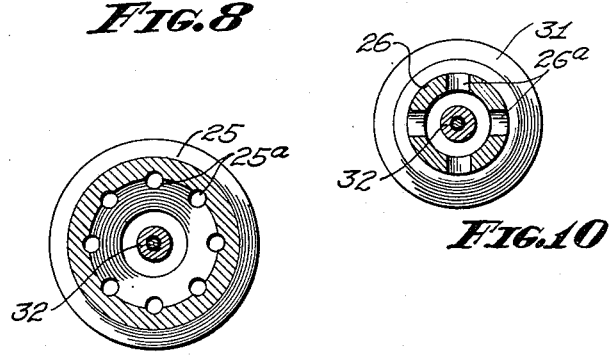
INVENTOR
Lloyd Spencer Sept. 7, 1937.  L. SPENCER  2,092,337
FORMATION TESTING APPARATUS
Filed May 1, 1935  4 Sheets-Sheet 3
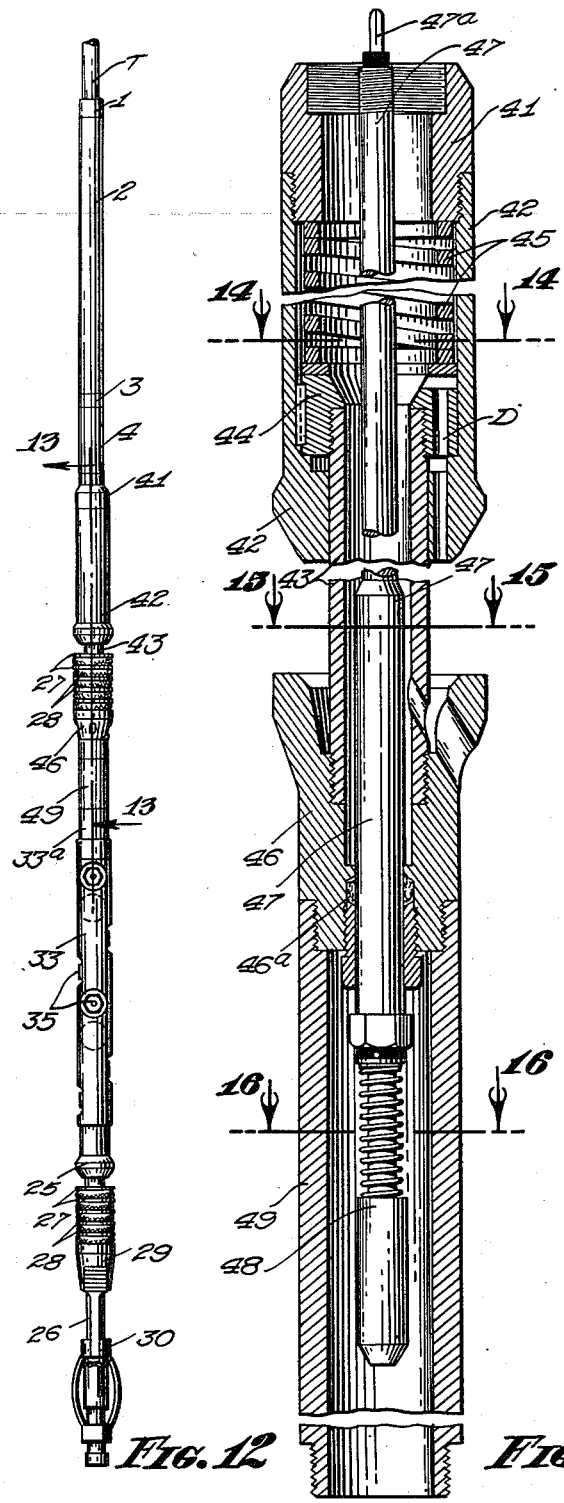
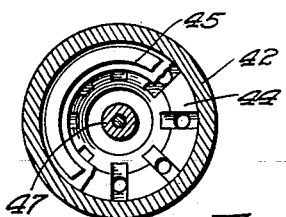
FIG.14
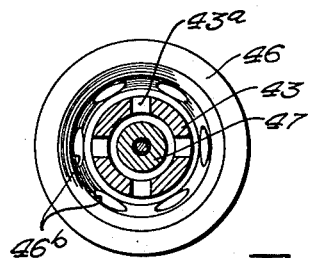
FIG.15
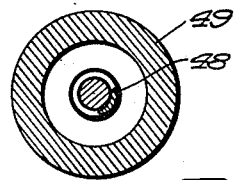
FIG.16
FIG.12  FIG.13
INVENTOR
Lloyd Spencer

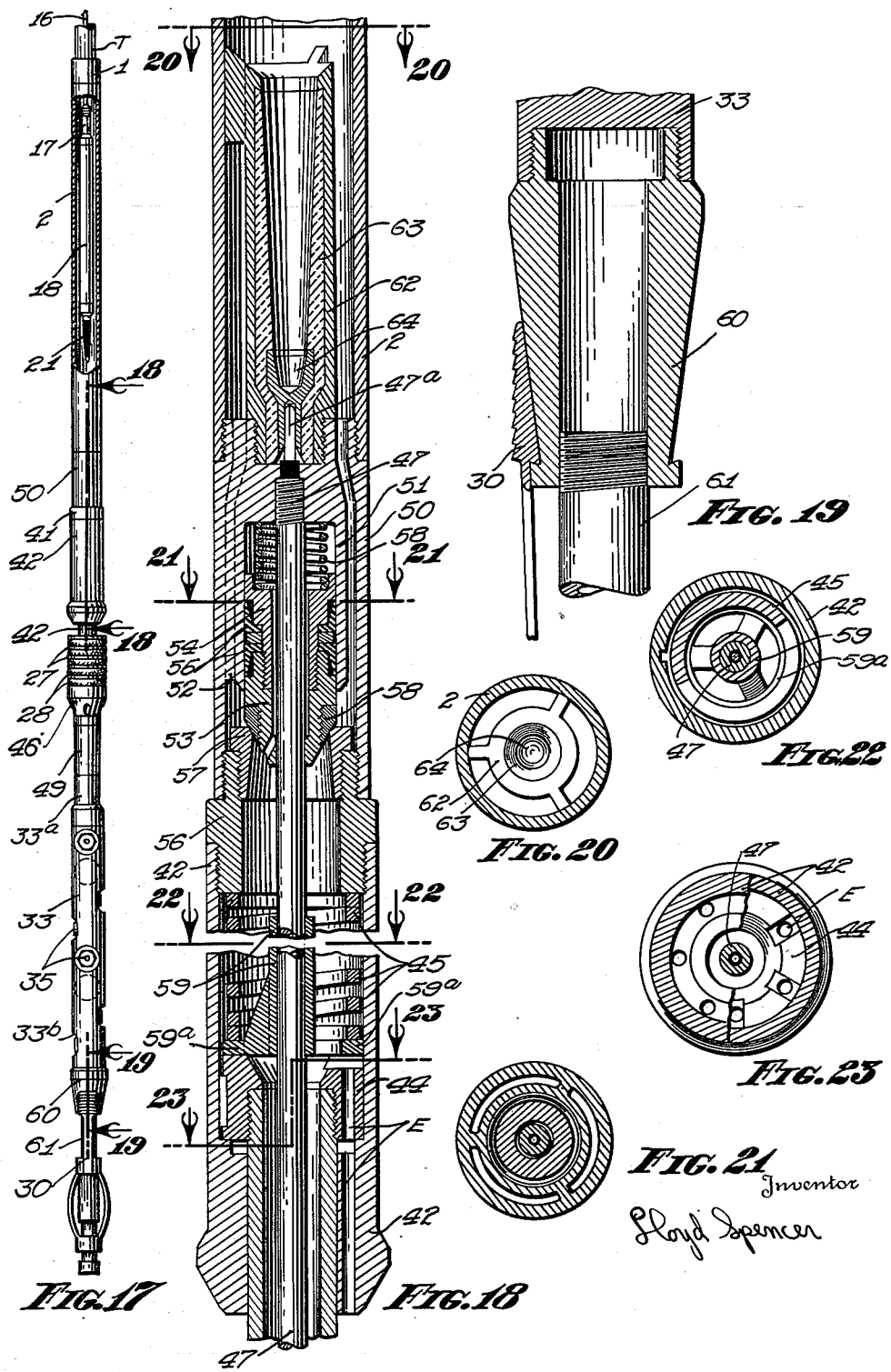

Patented Sept. 7, 1937

2,092,337

UNITED STATES PATENT OFFICE 2,092,337

FORMATION TESTING APPARATUS

Lloyd Spencer, Los Angeles, Calif., assignor to The Technicraft Engineering Corp., Los Angeles, Calif., a corporation of California Application May 1, 1935, Serial No. 19,247

28 Claims. (Cl. 166—1)

My invention relates to formation testing apparatus, and the objects of my invention are:

First, to provide a formation testing apparatus wherein a gun mechanism is incorporated with a tester valve structure and a packer and is adapted to be lowered therewith as a unit;

Second, to provide a formation testing apparatus which incorporates a novel means of operating the gun mechanism electrically from the surface of the well;

Third, to provide a novel removable connecter means for supplying electrical energy to an electrically responsive tool positioned in a well bore;

Fourth, to provide a novelly arranged formation tester valve structure of generally tubular form whereby a conductor or conduit may extend through the valve structure without interfering with its operation;

Fifth, to provide a novel tester valve and operating means therefor wherein the operating means may also function as the connecter for the gun mechanism;

Sixth, to provide projectile firing formation tester wherein the formation tester valve may be controlled from the surface independently of the operation of the gun;

Seventh, to provide a projectile firing formation tester whereby a thorough investigation of the zone perforated including production tests may be made, the tester permitting washing of the formation through the perforations made by the gun, such as by operation of a swab in the tubing string or circulation of fluid all without removing the formation tester;

Eighth, to provide a projectile firing formation tester which incorporates a novel valve structure responsive to either hydrostatic pressure from within the tubing string or mechanical force, but arranged to resist such hydrostatic pressure below a predetermined value; and, Ninth, to provide on the whole a novel method of conducting formation tests, which is particularly applicable within casing lined well bores.

With the above and other objects in view as may appear hereinafter, reference is made to the accompanying drawings, in which:

Figures 1 through 11 illustrate one form of the formation testing apparatus wherein a single packer is used and the tester valve is operated from within the tubing string; more particularly, Fig. 1 is a substantially diagrammatical elevational view thereof, showing the tubing string fragmentarily and indicating hoisting drum and electrical elements associated with the conductor cable; Fig. 2 is an enlarged fragmentary sectional view taken through 2—2 of Fig. 1; Fig. 3 is another enlarged fragmentary sectional view forming a continuation of Fig. 2 and taken through 2—2 of Fig. 1; Fig. 3 is sectional view continuing from Fig. 2 and taken through 3—3 of Fig. 1; Figs. 4, 5, and 6 are transverse sectional views taken through 4—4, 5—5, and 6—6 of Fig. 3; Fig. 7 is a fragmentary longitudinal sectional view continuing from Fig. 3 and taken through 7—7 of Fig. 1; Fig. 8 is a similar view continuing from Fig. 7 and taken 8—8 of Fig. 1; Fig. 9 is a transverse sectional view through 9—9 of Fig. 7; Fig. 10 is a transverse sectional view through 10—10 of Fig. 7; and Fig. 11 is a diagrammatical view of the electrical elements of the gun mechanism.

Figures 12 through 16 illustrate a modified form of the formation testing apparatus wherein two packers are employed, one below and one above the gun mechanism; more particularly, Fig. 12 is a substantially diagrammatical elevational view thereof; Fig. 13 is an enlarged fragmentary longitudinal sectional view thereof taken through 13—13 of Fig. 12, and Figs. 14, 15, and 16 are transverse sectional views through 14—14, 15—15, 16—16 respectively of Fig. 13.

Figures 17 through 23 illustrate a further modified form of my formation testing apparatus which incorporates a tester valve operated mechanically from below; more particularly, Fig. 17 is a substantially diagrammatical elevational view thereof showing gun incorporated with a single packer and between the packing assembly and slip assembly; Fig. 18 is an enlarged fragmentary longitudinal sectional view thereof taken through 18—18 of Fig. 17; Fig. 19 is another fragmentary longitudinal sectional view taken through 19—19 of Fig. 17; and Figs. 20, 21, 22, and 23 are transverse sectional views through 20—20, 21—21, 22—22, and 23—23 respectively of Fig. 18.

Attention is first directed to Figs. 1 through 11. The formation testing apparatus is connected to the lower end of a tubing string T by an adapter collar 1. The collar is in turn connected to a tube section 2, which is preferably slightly larger than the tubing string T. The tube section 2 is connected through a nipple 3 to a cylindrical valve housing 4.

The valve housing 4 is provided with a concentrically disposed cylinder 5 therein which may be connected therewith through integral webs 6. The cylinder is adapted to be sealed at its lower end but is open at its upper end and slidably receives a valve body 7. A sealing gland nut 8 which fits within the cylinder 5 is secured to valve body 7 so as to secure a pair of oppositely facing cupped sealing members 9.

The upper end of the valve body 7 protrudes from the cylinder 5 and is provided with a conical ring valve 10 having its valve face on its upper side and engageable with a valve seat member 11 secured to the nipple 3. A passage A is provided through the nut 8 and body 7 so as to connect the chamber B formed at the bottom of the cylinder with a point above the ring valve 10. The diameter of the valve seat is slightly larger than the internal diameter of the cylinder 5 so that fluid within the tubing string above the valve exerts an unbalanced pressure downwardly against such area represented by the difference in these diameters. A spring 12 within chamber B tends to hold the valve closed against this pressure but is readily responsive to mechanical force applied in a manner to open the valve.

The cylinder 5 receives in its lower or closed end a conduit 13 in the form of a tube with an insulated conductor therein. The conduit extends upwardly through the passage A and beyond the valve body 7 and is secured to a shell member 14a of a terminal means 14. The shell is constricted and internally threaded at its lower end for connection with the conduit. The shell is relatively long and has moulded or otherwise formed therein and sealed thereto an elongated insulation member 14b. Formed as an insert within the lower portion of the insulation member 14b is a terminal member 14c. The terminal member is provided with a socket 14e in its under side to receive a contact pin 13a protruding upwardly from the conductor of the conduit 13. The insulation member 14b is provided with a downwardly converging conical recess terminating in a recess 14d formed in the upper side of the terminal member 14c.

The shell 14a is slidably mounted within a sleeve 15 the lower end of which is joined to and supported by a stem 7a extending upwardly from the valve body. The upper end of the sleeve 15 is provided with a frusto conical guide fitting 15a.

The terminal means 14 and guide fitting 15a are adapted to be engaged by a combined weight bar and contactor structure lowered by a conductor cable 16. Said cable 16 is joined to a head 17 which in turn is screw threaded on the upper end of a weight bar 18 and is electrically connected to a conductor 19 extending through a bore provided in the weight bar. The lower end of the weight bar 18 is screwthreaded to a fitting 20. Said fitting 20 is provided with a beveled shoulder 20a which is adapted to engage the guide fitting 15a whereby the weight of the weight bar is applied to the sleeve 15 and valve body 7 to open the valve against the spring 12.

The fitting 20 is provided with an elongated tapering insulation member 21 which may be moulded around a contact bar 22. The lower end of the contact bar is enlarged to form a contact head 22a adapted to fit within the recess 14d of the terminal member 14c, while the insulation member 21 conforms with the recess provided in the insulation member 14b. The upper end of the contact bar 22 is provided with a yieldable terminal means 23 which engages a contact bolt 24 supported on an insulated partition within the lower end of the weight bar and connected with the conductor 19. The tester valve is, of course, adapted to open sufficiently to allow the contact head 22a and terminal member 14c to engage.

The elongated insulation members 14b and 21 provide a long leakage path so that contact can be made and current passed to a tool below the valve without too much loss even though salt water should be present.

The lower end of the valve housing 4 is secured to any suitable packer structure. In this case, the housing is shown secured to a packer head 25 of a "multiple ring" packer such as disclosed in Patent No. 1,625,016 for Packers for oil wells issued to Walter T. Wells. The packer head is in turn secured to a packer body 26 in the form of a tube which extends downwardly through a series of expansion rings 27 and packing rings 28 arranged in alternate relation, a slip setting cone 29, a slip assembly 30, and is joined at its lower end to connecting collar 31.

The upper portion of the connecting collar is provided internally with a packing gland 31a which fits an enlarged lower end of a conduit 32, similar to the conduit 13 and provided with an insulated conductor 32a therein. The conduit 32 extends upwardly through the packer body and is screwthreaded at its upper end into the bottom of the cylinder 5. The conductor 32a protrudes from the conduit 32 to form a prong 32b which fits in a socket 13b formed in the lower end of the conductor of the conduit 13, as shown in Fig. 3. The lower end of the conduit 32 carries an extensible terminal member 32c, as shown in Fig. 7.

The packer is provided with a bypass passage C between the packer body 26 and expansion rings 27, which, when the packer is being lowered or raised, is open between the packer head 25 and the uppermost expansion ring as shown in Fig. 7. These members are provided with valve face portions to provide a sealing connection therebetween when the packer is set. The packer head 25 is provided with ports 25a continuing from the bypass passage C and opening into the interior of the packer head 25 below the valve. Also the packer body 26 is provided with apertures 26a near its lower end. Either or both the ports or apertures may be provided, as both form a means of communication from below the packer to the interior of the tubing string.

The lower end of the connecting collar 31 is secured to a sleeve 33a of a gun body 33. Said sleeve 33a receives a controller 34 which is adapted to connect serially a plurality of gun units with the source of electrical energy supplied through the cable. The controller 34 is illustrated diagrammatically in Fig. 11 and, as here illustrated, comprises a solenoid and armature means 34a connected with the source of power and adapted to actuate a pawl 34b which engages a ratchet wheel 34c. The ratchet wheel turns a contactor 34d which engages a series of contacts 34e, there being one contact for each gun unit. A terminal means 34f on top of the controller is engaged by the terminal member 32c.

The gun body below the sleeve 33a is provided with a plurality of laterally directed sockets 33b each of which receives a gun unit 35. Each gun unit is provided with an explosive cartridge 35a having a fusible wire 35b therein which, when connected with the source of electrical energy, ignites the explosive. A barrel 35c adapted to receive a bullet 35d leads froms the explosive cartridge 35a. Said gun structure is more fully described in a copending application Serial No. 642,410 for Well casing perforator, Wilfred G. Lane applicant, and constitutes no part of the present invention except as it coacts with the other elements herein disclosed.

The structure illustrated in Figs. 12 through 16 is similar in most respects to the above described structure, except that two packers are shown, one below and one above the gun, and a telescopic connection is provided between the upper packer and the valve housing.

More particularly, the valve housing 4 as shown in Fig. 12 may be secured to a sub 41 which is secured to a special packer head 42. A special packer body 43 is provided, which is slidably mounted in the lower end of the packer head. The packer body 43 receives a coller 44 which forms a shoulder for limiting downward movement of the packer body relative to the packer head. A heavy spring 45 is positioned between the collar 44 and sub 41. Suitable passages D may be provided in the packer head and collar 44 to provide communication between the bypass passage C and the interior of the tubing string.

The packer body 43 is joined at its lower end to a collar 46 which takes the place of the slip expansion cone in supporting the lowermost of a set of packing rings. A series of such packing rings 28 and expansion rings 27 are provided between the collar 46 and packer head 42 but the slip assembly is omitted. The collar 46 is provided with a packing gland 46a which slidably receives the lower end of a conduit 47, similar to the conduit 32, and which is adapted to be connected in place of the conduit 32 to the cylinder 5. The lower end of the conduit 47 is provided with an elongated, yieldable contactor 48 adapted to engage the terminal 34f of the controller as in the first described structure, when the packer body telescopes in the packer head. A tube section 49 is interposed between the collar 46 and sleeve 33a of the gun body to provide the necessary space for the contactor 48.

The lower end of the gun body is secured to a packer head 35 of a packer structure, including the slip assembly 30. In order to operate the slip assembly, the packer body 43 is keyed, through its collar 44 to the packer head which is rigidly connected with the tubing string. In seating the two packers, pressure is applied through the spring 45 to seat the lower packer and directly through the packer head 42 to seat the upper packer.

Circulation apertures 46b are provided through the collar 46, and the packer body 43 may be provided with apertures 43a as in the first described structure.

Reference is now made to Figs. 17 through 23. The structure here illustrated may be incorporated with one or two packing units, and differs from the preceding constructions in that the tester valve is operated mechanically from below by utilizing the telescoping movement of the packer body in the packer head.

The coupling 1 and tube section 2 are used as in the first and second structures. Secured to the lower end of the tube section 2 is a cylindrical valve housing 50 in which is mounted a concentrically disposed cylinder 51 which may be attached thereto by webs 52 to provide passages between the cylinder and housing. The cylinder 51 is open at its lower end and slidably receives a valve body 53 having a packing nut 54 secured thereto within the cylinder and clamping a pair of cup-sealing members 55.

The lower end of the housing 50 is secured to a nipple 56 which is in turn secured to the packer head 42 disclosed in the second structure. The nipple 56 supports a valve seat member 57 engageable with a valve face member 58 of the valve body 53. The valve body and packing nut 54 are provided with a passage E extending from its lower end, below the valve seat 57 to the interior of the cylinder 51. The cylinder 51 and valve body are slightly larger than the valve face so that hydrostatic pressure above the valve exerts a predetermined upward force on the valve to open it; however, this area is sufficiently small that the valve will remain closed against a hydrostatic head reaching to the surface of the well in which the tool is used. A spring 58 may be provided to assist in holding the valve closed.

The arrangement of packer head 42, packer body 43, collar 44, and spring 45 of the second structure is incorporated in the present arrangement, except that between the spring 45 and collar 44 there is mounted the flanged and apertured lower end 59a of a valve lifting tube 59 which projects upwardly and is adapted to engage the valve body to raise and open it after the spring 45 has compressed a predetermined distance and the packer is set.

The lower end of the packer body 43 is attached to the gun mechanism as in the second structure. As shown in Fig. 17 expansion and packing rings only may be provided around the packer body 43, and a special slip setting cone 60 and slip assembly body or tube 61 may depend from the gun mechanism as shown in Fig. 19 and carry the slip assembly 30. If it is desired to pack off below as well as above a complete packer may depend from the gun mechanism in the manner shown in Fig. 12. Or, if desired, the packer body 43 may be extended to receive both packing and slip assemblies, and the gun attached to the lower end thereof, in the manner shown in Fig. 1.

The conduit 47 arranged at its lower end as shown in Fig. 18 extends upwardly through the packer body, valve lifting tube 59, and valve body 53 and is secured to the upper or closed end of the cylinder 51. The upper extremity of the cylinder 51 is secured to an upwardly extending shell 62 lined inside with an elongated downwardly tapering insulation sleeve 63 in which is moulded a terminal socket 64 which closes the lower end of the sleeve and is insulated thereby. Said socket is engaged by a contact pin 47a provided at the upper end of the conduit 47. The terminal socket 64 and its sleeve 63 is adapted to receive the contact bar 22 connected with the weight bar 18 and cable 16, the weight bar merely acting, in this case, to maintain contact between the contact bar 22 and terminal socket 64. The upper end of the shell 62 is flared so that the contact bar 22 is readily guided into place.

Operation of the above described embodiments of my invention is essentially the same, and is set forth as follows:

The gun, packer or packers and formation tester valve are made up in any of the arrangements indicated hereinbefore and lowered on a tubing string to the desired level; whereupon the tubing string is turned in the conventional manner to release the packer (or packers as the case may be) then the weight of the tubing string is applied to seat the packer. In the last described structure, seating of the packer automatically opens the tester valve.

After the packer is seated, the weight bar and its contact bar is lowered by the cable 16 and electrical connection is made with the gun. In the first two structures, this also opens the tester valve. After the gun is electrically connected, the gun units are fired in sequential order by turning the current on and off, as by switch 65 shown in Fig. 1, and causing the controller to advance contactor 34d around the circle of contacts 34e. Firing may stop as desired at any time before all the gun units are discharged. The weight bar is withdrawn, (closing the valves of the first two structures), and the tubing string is lifted (first closing the tester valve of the last described structure).

Sometimes it is desirable to clean or wash the formation opened by the projectiles fired from the gun. This may be done, very easily with the last described arrangement after removing the weight bar and before lifting the tubing string. A conventional swab or suction bailer may be manipulated in the tubing string to draw fluid from the formation or force fluid into the formation, and any of the other conventional means of testing and obtaining information regarding the formation opened by the gun may be employed.

The cable 16 is passed over a sheave 66 at the top of the well then around a suitable hoisting drum 67 which incorporates means for connecting the conductor of the cable to a source of power through the switch 65. The "steel" of the cable is grounded.

The invention herein disclosed also involves a novel method of making formation tests. Briefly, the method consists in lowering the apparatus including formation tester valve, packer or packers, and gun mechanism on a dry tubing string; packing off above, or both above and below the zone to be tested; then opening the zone to the atmospheric pressure existing in the tubing string either by movement of the tubing string or by lowering a weight bar therein; then firing one or more projectiles laterally through the casing.

Also the test may under some circumstances be conducted at different points without removing the apparatus. This is accomplished by firing one or two of the gun units; then testing through the tubing string to determine whether or not the formation is productive; and, if no or appreciably no fluid has entered the tubing string, the apparatus may be raised or lowered to another zone and the test repeated. Even if fluid should be produced and the depth permits the tubing string may be bailed or swabbed dry and another zone tested.

I claim:

1. In a well tool, the combination with a tubing string; of an electrically operative tool suspended from said tubing string; a terminal element for said tool exposed to the interior of said tubing string; a coacting terminal element and conductor cable therefor adapted to be lowered through said tubing string for establishing an electrical connection with said tool; complementary, elongated insulation members continuing from the respective terminal elements adapted, when said elements are immersed in a semi-conducting liquid, to provide a current leakage path of high resistance.

2. In a well tool, the combination with a tubing string; of a valve for controlling communication through the lower end of said tubing string; a tool suspended from the tubing string; a mechanically responsive element for opening said valve and a terminal element for said tool, both exposed to the interior of the tubing string; and means operative from within the tubing string for mechanically engaging said mechanically responsive element and establishing an electrical connection with terminal element.

3. In a well tool, the combination with a tubing string; of a valve controlling communication with said tubing string, and an electrically responsive tool suspended from the tubing string; a mechanically responsive element for opening said valve and a terminal element for said tool, both exposed to the interior of the tubing string; means operative from within the tubing string for mechanically and electrically engaging said elements; and a packer carried by said tubing string above said tool and operable by manipulation of said tubing string.

4. In a well tool, the combination with a tubing string; of a tool suspended from the tubing string; a weight responsive valve element and a terminal element for said tool, both exposed to the interior of said tubing string; a terminal and weight means; and a conductor cable for lowering said means thereby opening said valve element and contacting said terminal element.

5. In a formation testing apparatus, the combination with a tubing string; of a formation testing device including a valve structure for admitting fluids to the tubing string, and means actuated by manipulation of said tubing string for opening and closing said valve structure; and a gun mechanism suspended below the formation testing device.

6. In a formation testing apparatus, the combination with a tubing string; of a formation testing device including a valve structure for admitting fluids to the tubing string, and means actuated by manipulation of said tubing string for opening and closing said valve structure; a gun mechanism suspended below the formation testing device; a terminal element for said gun mechanism exposed to the interior of said tubing string; and current supplying means adapted to be lowered through said tubing string, including a contact head engageable with said terminal element.

7. In a formation testing apparatus, the combination with a tubing string; of a gun mechanism suspended from said tubing string; a formation testing valve structure for controlling the lower end of said tubing string and communicating with the well bore externally of the gun mechanism; and means for actuating said valve structure from the well mouth to cause flow of fluid into and from said tubing.

8. In a formation testing apparatus, the combination with a tubing string; of an electrically responsive gun mechanism suspended from the tubing string; a formation testing valve structure for controlling the lower end of said tubing string and communicating with the well bore externally of the gun mechanism; means for actuating said valve structure from the well mouth to cause flow of fluid into and from said tubing; and means for establishing an electric circuit to said gun through said tubing string.

9. In an oil well tool, the combination with a tubing string; of a formation tester and a gun supported from and adapted to be lowered into a well bore by said tubing string; means operable prior to firing said gun for actuating said formation tester to establish communication between the well bore opposite said gun and said tubing string; and means for firing said gun.

10. In a well tool, the combination with a tubing string; of a packer, a formation tester, and a gun supported from and adapted to be lowered into a well bore by said tubing string; said packer when set adapted to divide the well bore into two zones, in one of which is positioned the gun;

means operable prior to firing said gun for actuating said formation tester to establish communication between the zone containing said gun and the interior of the tubing string; and means for firing said gun.

11. In a formation testing apparatus, the combination with a tubing string: of a packer and an electrically responsive gun unit suspended from said tubing string with the packer uppermost; means defining a passage from said tubing string to the well bore below said packer; valve means in said passage for controlling ingress and egress of fluid to and from said tubing string; and means establishing electrical communication from said gun through said valve means and said tubing.

12. In a formation testing apparatus, the combination with a tubing string: of a packer and an electrically responsive gun unit suspended from said tubing string with the packer uppermost; means defining a passage from said tubing string to the well bore below said packer; valve means in said passage for controlling ingress and egress of fluid to and from said tubing string; a conduit from said gun unit passing through said valve into said tubing string; a terminal for said conduit in said tubing string; and an electrical supply cable adapted to be lowered into said tubing for electrical connection with said terminal.

13. In a formation testing apparatus: a gun perforator adapted to fire projectiles through a surrounding casing; means for isolating the section of casing opposite said gun perforator from the remainder of the well bore; a sample receiver having a port in communication with the section of casing isolated by said means; a control valve for said port; and means for opening said valve prior to discharge of said gun whereby said isolated section of casing is exposed to the pressure in said receiver.

14. In a formation testing apparatus: a gun perforator adapted to be lowered into a well bore to fire projectiles into the surrounding formation; means for isolating the region perforated by said gun from the hydrostatic head of fluid in said well bore; a receiver exposed substantially to atmospheric pressure, and having a port communicating with said region; a valve controlling said port; and means for opening said valve prior to discharge of said gun whereby said region is exposed to the pressure in said receiver.

15. The combination with a formation testing device comprising a packer adapted to be lowered into a well bore for sealing the region to be tested from the hydrostatic head of fluid thereabove; a sample receiver normally subjected to substantially atmospheric pressure; and valve means for exposing said region to said receiver while isolated from said hydrostatic head of fluid of: a perforator suspended below said packer for penetrating the formation opposite said region while said region is so isolated from said head of fluid.

16. The combination with a formation testing device comprising a packer adapted to be lowered into a well bore and seal the region to be tested from the hydrostatic head of fluid thereabove; a sample receiver normally subjected to substantially atmospheric pressure; and valve means for exposing said region to said receiver while isolated from said hydrostatic head of fluid of: a gun perforator suspended below said packer for firing projectiles into the formation back of said region while said region is so exposed to said receiver; and electrical control means for said perforator extending therefrom through said receiver to the mouth of the well bore.

17. In a formation testing apparatus: a tubing string; a packer adapted to be lowered thereby into a well bore to isolate the region to be tested from the hydrostatic head of fluid thereabove; a formation testing valve structure including mechanical means for establishing communication between said region and the tubing string, and hydraulic means for effecting back circulation out of said tubing string; a gun perforator suspended below said packer for firing projectiles into the surrounding formation back of said region to establish communication therewith; and electrical control means for said perforator including a current supply line extending from the perforator through the valve and tubing string to the mouth of the well bore.

18. In a formation testing apparatus: a tubing string; a packer adapted to be lowered thereby into a well bore for isolating a region to be tested from the hydrostatic head of fluid thereabove; a formation testing valve controlling communication between said region and the tubing string; means responsive to manipulation of the tubing string to open said valve; and a perforator for establishing communication between said region and the surrounding formation.

19. In a formation testing apparatus: a tubing string; a packer adapted to be lowered thereby into a well bore for isolating a region to be tested from the hydrostatic head of fluid thereabove; a formation testing valve controlling communication between said region and the tubing string; means responsive to manipulation of the tubing string to open said valve; a gun perforator suspended below said packer for firing projectiles into the surrounding formation back of said region to establish communication therewith; and electrical control means for said perforator including a current supply line extending from the perforator through the valve and tubing string to the mouth of the well bore.

20. In a formation testing apparatus: a tubing string; a packer adapted to be lowered thereby into a well bore for isolating a region to be tested from the hydrostatic head of fluid thereabove; a formation testing valve controlling communication between said region and the tubing string; a gun perforator suspended below said packer for firing projectiles into the surrounding formation back of said region to establish communication therewith; a device accessible from within the tubing string for opening said valve; an electrical terminal device for said gun perforator also accessible from within said tubing string; and an instrumentality adapted to be lowered in said tubing string for operative connection with said devices.

21. In a formation testing apparatus: a tubing string; a packer adapted to be lowered thereby into a well bore for isolating a region to be tested from the hydrostatic head of fluid thereabove; a formation testing valve controlling communication between said region and the tubing string; a gun perforator suspended below said packer for firing projectiles into the surrounding formation back of said region to establish communication therewith; a weight responsive device for opening said valve exposed to the interior of said tubing string; a terminal device for said perforator also exposed to the interior of said tubing string; a combined weight bar and contact means; and a conductor cable for lowering said means into said tubing string for engagement with said devices.

22. In a formation tester: a tubing string; a valve for controlling the lower end thereof; a packer suspended from the tubing string and including a packing element for isolating the region of a well bore to be tested from the hydrostatic head of fluid thereabove, and a member axially movable with respect to said tubing string to engage and open said valve; yieldable means restraining said member until seating of said packing element; and a perforator also suspended from said tubing string for establishing communication between said region and the surrounding formation.

23. In a formation tester: a tubing string; a valve for controlling the lower end thereof; a packer suspended from the tubing string and including a packing element for isolating the region of a well bore to be tested from the hydrostatic head of fluid thereabove, and a member axially movable with respect to said tubing string to engage and open said valve; yieldable means restraining said member until seating of said packing element; a gun perforator also suspended from said tubing string for firing projectiles into the formation surrounding said region to establish communication therewith; electrical means for firing said perforator; and a current supply line leading from said perforator past said valve and through tubing string to the mouth of the well bore.

24. In a formation tester: a tubing string; a valve for controlling the lower end thereof, said valve including a valve seat, a valve element seating downwardly thereon, a counterbalancing chamber above said valve, a bore through said valve element from below said seat to said chamber, and means for isolating said chamber from the interior of the tubing string; a packer suspended from the tubing string and including a packing element for isolating the region of a well bore to be tested from the hydrostatic head of fluid thereabove, and a member axially movable with respect to said tubing string to engage and open said valve; yieldable means restraining said member until seating of said packing element; an electrically operable perforator suspended below said packing element to establish communication between said region and the surrounding formation; and a conductor leading therefrom through said valve element and sealingly projecting through said chamber into said tubing string.

25. The combination with a tubing string and an electrically operable apparatus suspended therefrom of: a valve for controlling ingress and egress of fluid to and from said tubing string; a piston and cylinder means incorporating said valve and forming a counterbalancing chamber, there being a bore through said valve; and a conductor leading from said apparatus into said tubing string, said conductor utilizing the bore of said valve and being sealed in said cylinder means.

26. The combination with a tubing string and an electrically operable apparatus suspended therefrom of: a valve for controlling ingress and egress of fluid to and from said tubing string, said valve including a valve seat, a valve element seating downwardly thereon, a counterbalancing chamber above said valve, a bore through said valve element from below said seat to said chamber, and means for isolating said chamber from the interior of the tubing string; a conductor leading from said apparatus through the valve bore and sealingly projecting through said chamber into said tubing string; and means responsive to manipulation of the tubing string for opening said valve.

27. The combination with a tubing string and an electrically operable apparatus suspended therefrom of: a valve for controlling ingress and egress of fluid to and from said tubing string, said valve exposed to the interior of said tubing string; a piston and cylinder means incorporating said valve and forming a counterbalancing chamber, there being a bore through said valve; a conductor leading from said apparatus into said tubing string, said conductor utilizing the bore of said valve and being sealed in said cylinder means; and a combined valve opening member and contactor adapted to be lowered into said tubing string for operative engagement with said valve and electrical connection with said conductor.

28. In a formation testing apparatus: a tubing string; a packer adapted to be lowered thereby into a well bore to isolate the region to be tested from the hydrostatic head of fluid thereabove; a formation testing valve structure including mechanical means for establishing communication between said region and the tubing string, and hydraulic means for effecting back circulation out of said tubing string; and a perforator for establishing communication between said region and the surrounding formation.

LLOYD SPENCER.

Disclaimer 2,092,337.—*Lloyd Spencer*, Los Angeles, Calif. FORMATION TESTING APPARATUS. Patent dated Sept. 7, 1937. Disclaimer filed Mar. 1, 1951, by the assignee, *Lane-Wells Company*.

Hereby disclaims claims 5, 7, 9, 10, 13, 14, 15, 18, 22, and 28 of said patent.
[*Official Gazette March 27, 1951.*]